United States Patent [19]

Fox

[11] Patent Number: 4,828,076

[45] Date of Patent: May 9, 1989

[54] LOCK CHOCK FOR TANDEM AXLE WHEELS

[75] Inventor: Robert Fox, Wilmington, Calif.

[73] Assignee: Norco Industries, Inc.

[21] Appl. No.: 154,481

[22] Filed: Feb. 1, 1988

Related U.S. Application Data

[63] Continuation of Ser. No. 935,779, Nov. 28, 1986, abandoned.

[51] Int. Cl.$^4$ .............................................. B60T 3/00
[52] U.S. Cl. ..................................... 188/32; 188/4 R; 188/36
[58] Field of Search ............... 188/32, 36, 2 R, 4 R, 188/74; 410/30, 36, 42, 49, 47, 66

[56] References Cited

U.S. PATENT DOCUMENTS

| | | | |
|---|---|---|---|
| 213,203 | 3/1879 | Jewell | 188/32 |
| 1,035,381 | 8/1912 | Moss | 188/32 |
| 3,695,394 | 10/1972 | Carpenter | 188/32 |
| 4,186,823 | 2/1980 | White | 188/32 |

FOREIGN PATENT DOCUMENTS

| | | | |
|---|---|---|---|
| 735845 | 11/1932 | France | 188/74 |
| 610513 | 10/1960 | Italy | 188/32 |
| 112704 | 1/1918 | United Kingdom | 188/4 R |

Primary Examiner—Andres Kashnikow
Assistant Examiner—Mark T. Le
Attorney, Agent, or Firm—Beehler, Pavitt, Siegemund, Jagger, Martella & Dawes

[57] ABSTRACT

A locking chock which is of the character of a ground brake for the fore and aft wheels of a tandem axle vehicle makes use of a separate chock or blocker for each wheel. Each chock has a flat, ground-engaging face and an oblique wheel-engaging face. There is an initially retracted threaded shaft extending between the chocks which, once the chocks are in proper position, is extended to push the chocks into blocking engagement against the corresponding opposite wheels.

5 Claims, 1 Drawing Sheet

U.S. Patent
May 9, 1989
4,828,076
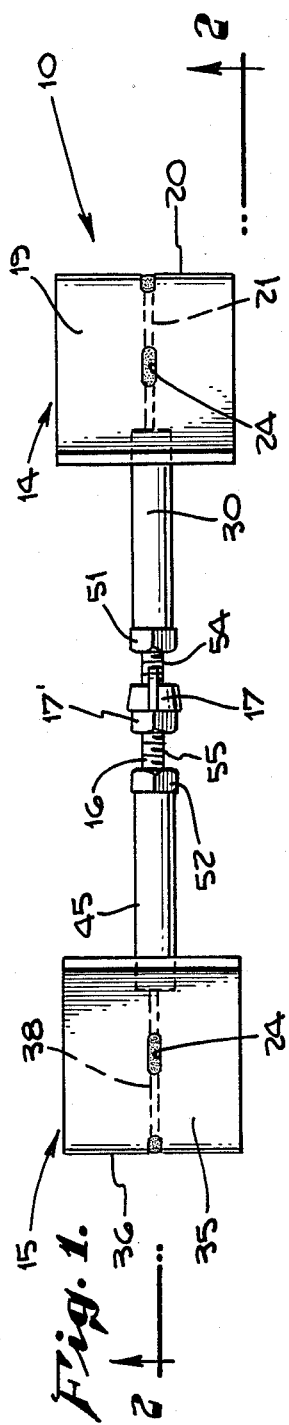
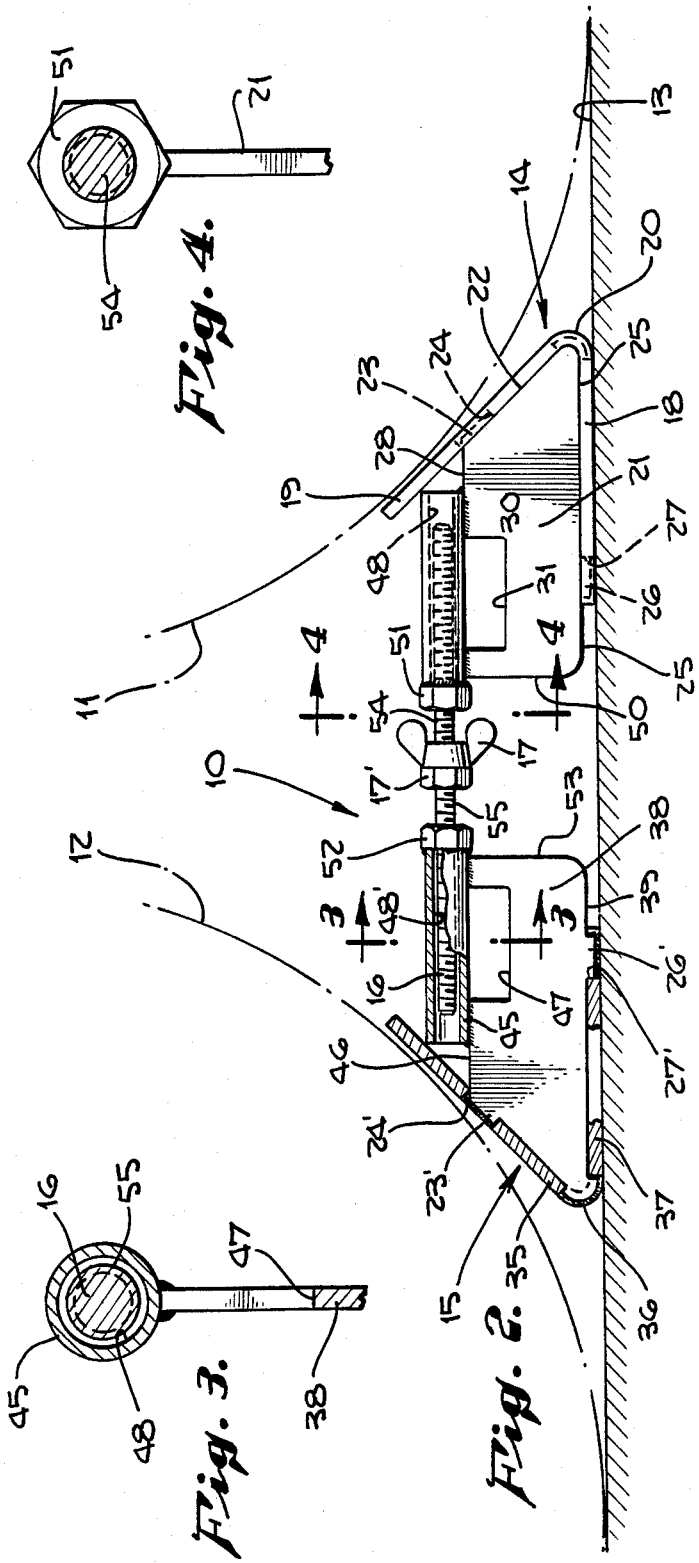

LOCK CHOCK FOR TANDEM AXLE WHEELS

This is a continuation of application Ser. No. 06/935,779, filed Nov. 28, 1986, now abandoned.

When vehicles with tandem axle wheels are to be parked at a selected location and expected to remain immovably in fixed position until the occasion arises when they are again expected to be mobile, some type of braking mechanism is needed. Such need becomes particularly acute when the surface on which the vehicle is parked is other than level. Under circumstances where the vehicle is a trailer type vehicle, not supplied with a conventional braking arrangement, some form of blocking device for the wheels becomes necessary, whether the vehicle be supplied with only one wheel or with tandem axle wheels.

In recognition of this need, the industry has heretofore provided tandem locking chocks of some description which, once in position between the wheels of the tandem axles, can be pushed against each other by some appropriate mechanism into positions where one chock is pushed to blocking position against a forward wheel and the other chock simultaneously pushed into blocking position against the aft wheel. Chocking devices of this general character and of varying degrees of mechanical capability have heretofore been available. Practical problems represented, for example, by variable spacing in a fore and aft direction with respect to the tandem axles need to be met.

Locking chocks of this general character, being extra equipment not mounted on the vehicle during travel, must be conveniently stowed when not in use and then made readily available when the need for use arises. Each pair of locking chocks must be handled as a pair, and there is invariably a need for at least two pairs for any vehicle. The two pairs, of course, should be matching pairs. Chocks of the character made reference to must further be of a construction adaptable to whatever surface might be encountered where the vehicle is to be parked.

It is therefore among the objects of the invention to provide a new and improved lock chock assembly for tandem axle wheels which is of relatively simple construction and moreover having an infinite adjustment capability throughout a selected range within the size limitations chosen.

Another object of the invention is to provide a new and improved lock chock assembly for tandem axle wheels which, though of relatively simple construction, is of a character which, once adjusted into chocking position against the wheels, will not slip loose.

Still another object of the invention is to provide a new and improved lock chock assembly for tandem axle wheels wherein opposite blocks of the chock, once spread apart into chocking position against the wheels with customary inflated tires, will not be yieldable in directions toward each other during use.

Further included among the objects of the invention is to provide a new and improved lock chock assembly for tandem axle wheels having relatively few parts of rugged construction which, when released and to be stored, can be readily separated one part from another to provide a compact arrangement for stowing.

Included also among the objects of the invention is to provide a new and improved lock chock assembly of construction enabling it to be used not only against tires of a tandem wheel structure but which, when the need arises, can be readily partially disassembled for use against the tires of single wheels.

Still further included among the objects of the invention is to provide a new and improved lock chock assembly for tandem axle wheels which, though inexpensively constructed of sheet material, is formed in a fashion providing rugged chocks adequately reinforced and properly shaped for maximum chocking effect, while at the same time having a compact form when disengaged and ready for stowage.

With these and other objects in view, the invention consists of the construction, arrangements, and combination of the various parts of the device serving as an example only of one or more embodiments of the invention, whereby the objects contemplated are attained, as hereinafter disclosed in the specification and drawings and pointed out in the appended claims.

In the drawings:

FIG. 1 is a plan view of a lock chock assembly in the spread condition required during operation.

FIG. 2 is a side elevational view on the line 2—2 of FIG. 1 showing the relative positions of parts of the lock chock assembly with respect to wheels on tandem axles.

FIG. 3 is a fragmentary cross-sectional view on the line 3—3 of FIG. 2.

FIG. 4 is a fragmentary cross-sectional view on the line 4—4 of FIG. 2.

In one embodiment of the invention chosen for the purpose of illustration, a lock chock assembly, indicated generally by the reference character 10, is one adapted for use between wheels 11 and 12 which may be assumed to be positioned on a pair of conventional tandem axles (not shown) of the type frequently made use of in supporting relatively heavier trailers. Wheels in conventional tandem arrangement as suggested may on occasion also be traction wheels. Further, by way of example, the wheels 11 and 12 are shown in position against a supporting surface 13 which may on occasions be a pavement, a leveled area, or in fact an area of any configuration upon which a vehicle might be parked, whether level or on a grade.

The lock chock assembly 10 consists mainly of fore and aft blockers 14 and 15 interconnected by use of an exteriorly threaded shaft 16 upon which a wing nut 17 is anchored midway between opposite ends. Adjacent the wing nut is a hexagonal nut 17' also anchored to the threaded shaft whereby to provide a wrenchhold when needed.

In the chosen embodiment the blocker 14 is shown as being constructed of sheet material consisting of a relatively flat section 18 for engagement with the supporting surface 13 and a relatively flat section 19 extending obliquely upwardly from the section 18. The sections 18 and 19 are integrally joined along a folded edge 20. To anchor the sections 18 and 19 in their relatively oblique position, use is made of a rib 21 cut to the angular disposition of the sections 18 and 19. On an upper oblique edge 22 of the rib are tabs 23 which project into holes 24 in the section 19 where they are welded. Similarly on the lower edge 25 are tabs 26 which project into holes 27 in the section 18 where they also are welded. On a horizontal top edge 28 of the rib 21 a sleeve 30 is welded in position. There is a cut-out 31 to provide a hand-hold.

The blocker 15 is of similar construction and embodies a relatively flat section 35 attached along a folded edge 36 to a relatively flat section 37, the latter flat section being adapted to engage the supporting surface 13. In this instance the sections 35 and 37 are reinforced in their angular disposition by an appropriately shaped rib 38 which is joined to the flat section 35 by appropriate tabs 23' welded in holes 24'. Comparable tabs 26' welded in holes 27' interconnect the rib 38 with the flat section 37.

Effective operation is improved by having exposed faces of both flat sections of the block of relatively rough texture as, for example, a rolled on diamond-shaped pattern. A better grip is accordingly provided for both engagement with the wheels 11 and 12 and with the supporting surface 13.

For the blocker 15 there is provided a sleeve 45 anchored to a top edge 46 of the corresponding rib by means of an appropriate weldment similar to the sleeve 30 on the rib 21. Here also to provide a handhold, there is a cut-out 47 beneath the sleeve 45. It is of consequence to note that there is a smooth bore 48 within each of the sleeves 30 and 45 through which an end of the threaded shaft 16 is free to slide.

At the end of the sleeve 30 of the rib 21 and coincident with a vertical edge 50, a nut 51 is anchored in place. Similarly for the rib 38 and its sleeve 45 there is anchored a nut 52 at a vertical edge 53. As viewed in FIG. 2, the right end portion 54 of the threaded shaft 16 has a right-hand thread engaging a right-hand thread in the nut 51. Conversely, the left-hand end portion 55 has a left-hand thread engaging a left-hand thread in the nut 52.

In operation when the lock chock assembly is to be installed, the wing nut 17 is backed off by rotation in a withdrawal direction for the blockers 14 and 15 until there is an abundance of room between respective flat sections 19 of the blocker 14 and 35 of the blocker 15. In that position they comfortably clear adjacent faces of, respectively, the wheel 11 and the wheel 12. Once the chocks are in proper position, the wing nut 17 is rotated in the opposite direction together with the threaded shaft 16 so as to extend both blockers 14 and 15 until they engage the corresponding wheels 11 and 12. After all of the slack has been taken up in the manner described, the blocker 14 is pushed toward the right against the surface of the wheel 11 and the blocker 15 toward the left against the wheel 12. Rotation of the wing nut 17 may be continued by hand for a period long enough to completely wedge the flat sections 19 and 35 snugly against the respective wheels 11 and 12 to firmly wedge the blockers of the lock chock assembly into their positions, blocking further rotation of the wheels. Should hand rotation be insufficient, a wrench can be applied to the hexagonal nut 17'. Whether the supporting surface 13 be a simple flat surface, such as that depicted in FIG. 2, or a rougher surface pitched in one direction or another, or other irregular supporting surface, the lock chock assembly is operated in the same fashion.

For unblocking action of the lock chock assembly, it is necessary merely to back off the blockers by rotation of the wing nut 17 in the opposite direction simultaneously releasing pressure of the flat sections 19 and 35 against the corresponding wheels. The blockers 14 and 15 can then be further withdrawn in a direction toward each other for a comfortable clearing distance, after which the blockers can be removed from their positions between the wheels 11 and 12. In case one or both of the ground-engaging flat sections 18 or 37 be jambed into the supporting surface 13, resort may again be had to a wrench applied to the hexagonal nut 17'. The structure lends itself to a one-time adjustment position to accommodate tandem wheels set at a fixed distance apart on a chosen vehicle.

The ends 54 and 55 of the threaded shaft 16, after engagement with the corresponding nuts 51 and 52, are freely received in the smooth bores 48, 48' of the corresponding sleeves. If desired, one of the blockers can be removed from the threaded shaft 16, thereby making a smaller package for stowage on the vehicle when not in active use. Because of being capable of removal, the blockers can be used separately against tires of single wheels.

While a particular embodiment of the present invention has been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is as follows:

I claim:

1. A free-standing lock chock assembly for tandem axle wheels in fore and aft alignment on one side of a vehicle, said lock chock assembly comprising fore and aft blockers having an extending and retracting interconnection comprising a single exteriorly threaded shaft integral throughout its length, opposite ends of said shaft having a fore and aft engagement with corresponding blockers, one of said fore and aft engagements being a right-hand threaded engagement and the other being a left-hand threaded engagement, an adjusting nut having a fixed attachment to the shaft substantially midway between opposite ends, said adjusting nut and shaft being rotatable in a first direction for movement of said blockers to positions of engagement with said wheels and being rotatable in the opposite direction for retraction of said blockers from positions of engagement with said wheels, there being a fore and aft extending rib of sheet material on each of said blockers at a location substantially midway between opposite side edges, a corresponding end portion of said shaft having a fixed position of fore and aft alignment with a long axis of the corresponding rib and attached blocker, the engagement of each end portion of the shaft with the corresponding blocker being a threaded engagement at the location of the respective ribs of said blockers, a sleeve anchored to the upper edge of the rib and extending a distance in excess of one half the length of the rib, said sleeve having an open ended bore therethrough with a substantial portion of the length of the corresponding end of the threaded shaft lodged in the bore, an interiorly threaded member on the exposed horizontal end of the rib, the engagement of the shaft with the respective blocker being a threaded engagement between the respective end of said shaft and the interiorly threaded member of the blocker, each of said blockers comprising a member of sheet material with two relatively flat sections bent with respect to each other providing adjacent sections in an acute fixed angular relationship whereby one flat section comprises a ground-engaging section and the other flat section provides a wheel-engaging section, the rib being anchored immovably to adjacent corresponding faces of the ground-engaging section and wheel-engaging section.

2. A lock chock as in claim 1 wherein the adjusting nut comprises handhold extension means and alternative wrenchhold means in fixed position with respect to each other and to the threaded shaft.

3. A lock chock assembly as in claim 1 wherein there is an opening between each rib and the adjacent sleeve whereby to provide an exposed portion of the sleeve for use as a handhold.

4. A lock chock assembly as in claim 1 wherein there are projections on the edge of each rib and in alignment with the sleeve adjacent a corresponding flat section of the blocker and complementary recesses in the flat section of the blocker receptive of the projections.

5. A lock chock assembly as in claim 1 wherein the individual parts of said assembly are no greater than ten in number.

* * * * *